United States Patent
Kagan

(10) Patent No.: US 8,949,498 B2
(45) Date of Patent: *Feb. 3, 2015

(54) INTERRUPT HANDLING IN A VIRTUAL MACHINE ENVIRONMENT

(71) Applicant: Mellanox Technologies Ltd., Yokneam (IL)

(72) Inventor: Michael Kagan, Zichron Yaakov (IL)

(73) Assignee: Mellanox Technologies Ltd., Yokneam (IL)

( * ) Notice: Subject to any disclaimer, the term of this patent is extended or adjusted under 35 U.S.C. 154(b) by 214 days.

This patent is subject to a terminal disclaimer.

(21) Appl. No.: 13/652,493

(22) Filed: Oct. 16, 2012

(65) Prior Publication Data

US 2013/0042242 A1 Feb. 14, 2013

Related U.S. Application Data

(63) Continuation-in-part of application No. 13/207,418, filed on Aug. 11, 2011.

(51) Int. Cl.
- G06F 13/24 (2006.01)
- G06F 9/455 (2006.01)
- G06F 9/48 (2006.01)

(52) U.S. Cl.
CPC .......... *G06F 9/45558* (2013.01); *G06F 9/4812* (2013.01); *G06F 2009/45579* (2013.01)
USPC ............................................. 710/262; 718/1

(58) Field of Classification Search
None
See application file for complete search history.

(56) References Cited

U.S. PATENT DOCUMENTS

| | | | | |
|---|---|---|---|---|
| 7,209,994 | B1* | 4/2007 | Klaiber et al. | 710/264 |
| 7,222,203 | B2* | 5/2007 | Madukkarumukumana et al. | 710/260 |
| 7,302,511 | B2 | 11/2007 | Jeyasingh et al. | |
| 8,180,944 | B2* | 5/2012 | Serebrin et al. | 710/269 |
| 2008/0294825 | A1* | 11/2008 | Mahalingam et al. | 710/262 |
| 2010/0023666 | A1* | 1/2010 | Mansell et al. | 710/267 |
| 2010/0070677 | A1* | 3/2010 | Thakkar | 711/6 |
| 2010/0115514 | A1 | 5/2010 | Maliszewski et al. | |
| 2010/0174841 | A1* | 7/2010 | Bogin et al. | 710/260 |
| 2010/0191885 | A1* | 7/2010 | Serebrin et al. | 710/260 |
| 2010/0191887 | A1* | 7/2010 | Serebrin | 710/267 |
| 2010/0191888 | A1* | 7/2010 | Serebrin et al. | 710/269 |
| 2010/0191889 | A1* | 7/2010 | Serebrin | 710/269 |
| 2010/0333101 | A1 | 12/2010 | Pope et al. | |
| 2011/0106993 | A1 | 5/2011 | Arinobu et al. | |
| 2011/0179417 | A1 | 7/2011 | Inakoshi | |

OTHER PUBLICATIONS

U.S. Appl. No. 13/207,418 Office Action dated Mar. 18, 2013.

* cited by examiner

*Primary Examiner* — Lewis A Bullock, Jr.
*Assistant Examiner* — Melissa Alfred
(74) *Attorney, Agent, or Firm* — D. Kligler I.P. Services Ltd

(57) ABSTRACT

A method for computing includes running a plurality of virtual machines on a computer having one or more cores and a memory. Upon occurrence of an event pertaining to a given virtual machine during a period in which the given virtual machine is unable to receive an interrupt, an interrupt message is written to a pre-assigned interrupt address in the memory. When the given virtual machine is able to receive the interrupt, after writing of the interrupt message, a context of the given virtual machine is copied from the memory to a given core on which the given virtual machine is running, and a hardware interrupt is automatically raised on the given core responsively to the interrupt message in the memory.

16 Claims, 2 Drawing Sheets

INTERRUPT HANDLING IN A VIRTUAL MACHINE ENVIRONMENT

CROSS-REFERENCE TO RELATED APPLICATION

This application is a continuation-in-part of U.S. patent application Ser. No. 13/207,418, filed Aug. 11, 2011, whose disclosure is incorporated herein by reference.

FIELD OF THE INVENTION

The present invention relates generally to computer systems, and specifically to handling of interrupts in a virtual machine environment.

BACKGROUND OF THE INVENTION

A virtual machine (VM) is a software implementation of a computer that executes programs like a physical machine. The VM supports an operating system (commonly referred to as a guest operating system) and application programs, which run on the VM transparently, as though it was an actual physical machine. Multiple virtual machines may share the same underlying physical machine resources. A software layer known as a virtual machine monitor (VMM, also referred to as a hypervisor) provides virtualization support to the VMs by mediating between the VM software and the underlying physical hardware.

SUMMARY

Embodiments of the present invention that are described hereinbelow provide efficient methods and devices for handling interrupts in a VM environment.

There is therefore provided, in accordance with an embodiment of the present invention, a method for computing, which includes running a plurality of virtual machines on a computer having one or more cores and a memory. Upon occurrence of an event pertaining to a given virtual machine during a period in which the given virtual machine is unable to receive an interrupt, an interrupt message is written to a pre-assigned interrupt address in the memory. When the given virtual machine is able to receive the interrupt, after writing of the interrupt message, a context of the given virtual machine is copied from the memory to a given core on which the given virtual machine is running, and a hardware interrupt is automatically raised on the given core responsively to the interrupt message in the memory.

The interrupt message may be written to the interrupt address while the given virtual machine is swapped out of operation, and the context is copied responsively to activating the given virtual machine on the given core.

Additionally or alternatively, the interrupt message may be written to the interrupt address while interrupts are disabled at least to the given core on which the given virtual machine is running, and the context is copied responsively to enabling the interrupts on the given core.

In some embodiments, the interrupt message is written by a peripheral device that is coupled to the one or more cores. The peripheral device may include a network interface controller (NIC), and the event may include receiving at the NIC a data packet directed to the given virtual machine.

In a disclosed embodiment, writing the interrupt message includes identifying at a source of the interrupt message whether the given virtual machine is active or swapped out, and deciding to write the interrupt message to the memory when the given virtual machine is swapped out or to raise the hardware interrupt immediately when the given virtual machine is active.

The event causing the interrupt message to be written to the pre-assigned interrupt address in the memory may be a first event type, and the method may include, upon the occurrence of events of a second event type, raising the hardware interrupt for service by the given virtual machine immediately even when the given virtual machine is swapped out.

In disclosed embodiments, automatically raising the hardware interrupt includes copying the interrupt message from the respective interrupt address to an interrupt status register on the given core. In one embodiment, the interrupt message is copied and the hardware interrupt is raised by a virtual machine monitor (VMM), which runs on the computer and supports the virtual machines. In another embodiment, the interrupt message is copied to a dedicated interrupt status register that is serviced by the given virtual machine.

There is also provided, in accordance with an embodiment of the present invention, computing apparatus, including one or more computing cores, configured to run a plurality of virtual machines. A memory is connected to the computing cores. A device, which is connected to the cores and the memory, is configured, upon occurrence of an event pertaining to a given virtual machine during a period in which the given virtual machine is unable to receive the interrupt, to write an interrupt message to a pre-assigned interrupt address in the memory. The cores are configured, when the given virtual machine is able to receive the interrupt, after writing of the interrupt message, to copy a context of the given virtual machine from the memory to a given core on which the given virtual machine is running, and to automatically raise a hardware interrupt on the given core responsively to the interrupt message in the memory.

The present invention will be more fully understood from the following detailed description of the embodiments thereof, taken together with the drawings in which:

DETAILED DESCRIPTION OF EMBODIMENTS

Figure 1:
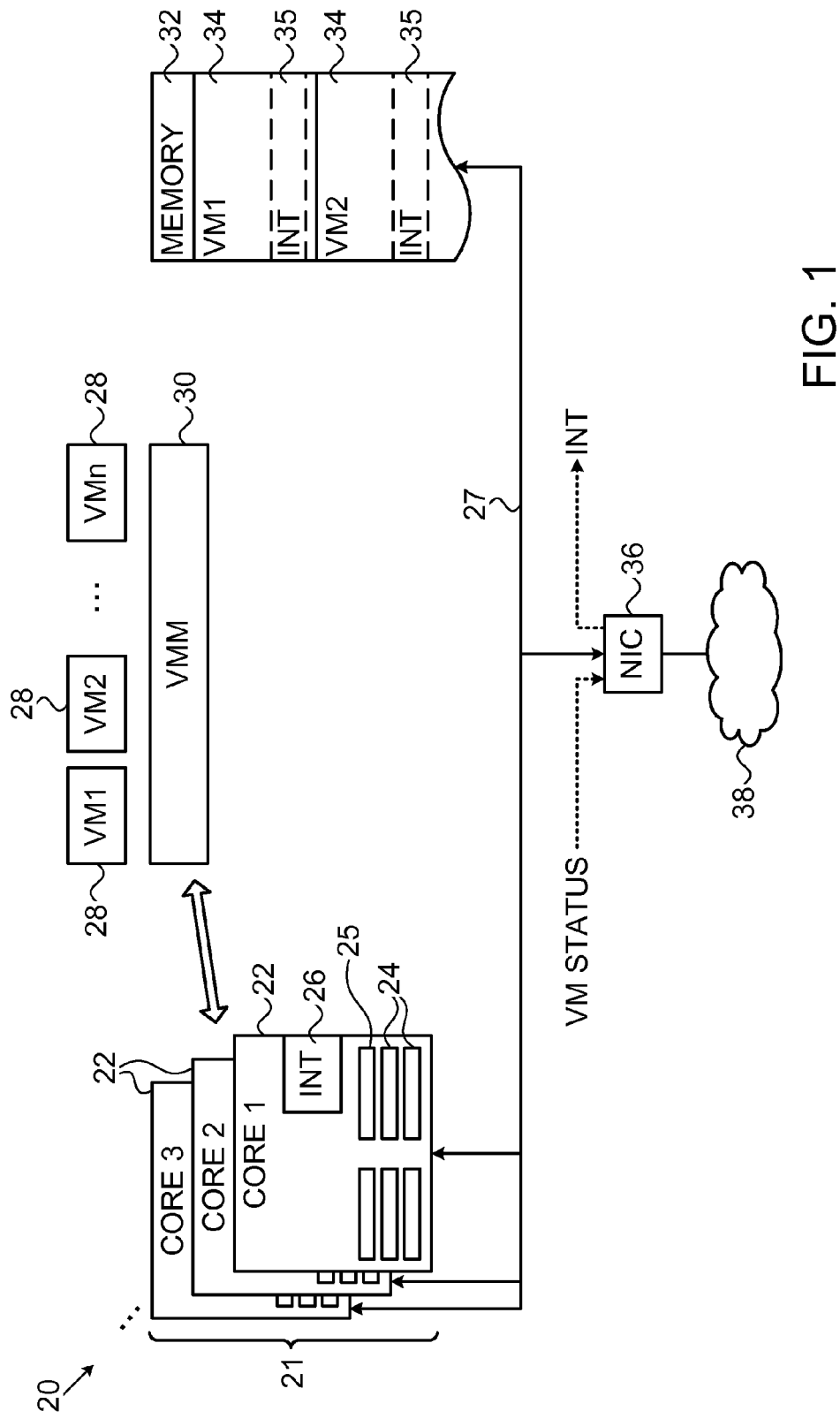
FIG. 1 is a block diagram that schematically illustrates a computer system, in accordance with an embodiment of the present invention.

In many virtualized environments, the number of virtual machines (VMs) in operation at any given time may substantially exceed the number of computing cores (which may be one or more) in the central processing unit (CPU) of the computer that are available to execute the VMs. Under these conditions, the VMs are swapped into and out of the cores, typically under control of the VMM, as they are needed for software tasks and as core resources become available. Each VM swap of this sort involves a context switch, in which register contents representing the operating state (the context) of the swapped-out VM are copied out of the core to memory, and the context of the VM that is to be swapped in is copied from the memory to the registers of the core in question.

Interrupt handling in this sort of environment can consume considerable time and system resources. Hardware interrupts raised by peripheral devices, such as a network interface controller (NIC) or other input/output (I/O) device, are detected by the VMM. Upon receiving an interrupt, the VMM must suspend execution of the active VM to service the interrupt—even if the interrupt is directed to a VM that is currently swapped out of operation. In I/O-intensive applications, in which peripheral devices frequently raise interrupts to signal incoming communications, the frequent breaks that are necessitated for handling interrupts directed to swapped-out VMs can degrade overall system performance.

Furthermore, the VMM may receive an interrupt for a given VM while interrupts are disabled on the core on which the VM is running. (Interrupts may be disabled by the VM, for example, while the guest operating system of the VM is servicing a previous interrupt.) To handle this sort of situation, the VMM expends computing resources in keeping track of the interrupt enabled/disabled state of the virtual machines and interacting with the CPU interrupt controller so that the interrupt to the VM is asserted at the proper time.

Embodiments of the present invention that are described herein address these problems by providing virtualization of interrupts: Upon occurrence of an event pertaining to a given VM that is currently unable to receive an interrupt, because the VM is swapped out or interrupt-disabled, for example, the interrupt is not sent directly to the CPU. Rather, an interrupt message is written to a specified interrupt address in a memory segment that is assigned to hold the value of the interrupt status register for the given VM. When the given VM is subsequently able to receive, this memory segment is copied to the registers of the core on which the VM is running. When the memory contents are copied, the message that was saved in the interrupt address automatically causes the appropriate hardware interrupt to be raised on the core. The VM may then service the interrupt, and the VMM is no longer required to deal immediately with interrupt-invoking events that are directed to swapped-out or interrupt-disabled VMs.

The approach to interrupt handling that is described able is useful particularly in dealing with events that are generated by an I/O device, such as events relating to reception of incoming data packets by a NIC. For this reason, the embodiments that are described hereinbelow relate specifically to this sort of scenario, in which a NIC, connected by a bus to a CPU and memory, issues interrupts directed to VMs running on the CPU. The principles of the present invention, however, are similarly applicable to handling of interrupts generated by other components in a computer system that runs multiple virtual machines, whether such components are peripheral devices connected to the CPU by a bus or are more closely integrated with the CPU itself.

FIG. 1 is a block diagram that schematically illustrates a computer system 20, in accordance with an embodiment of the present invention. System 20 in this example comprises a central processing unit (CPU) 21 having multiple cores 22. Each core comprises processing circuits and multiple registers 24, including an interrupt status register 25. Each core may also comprise an interrupt controller 26, with one or more interrupt inputs, referred to as "pins." The interrupt pins are typically "raised" by transmitting an interrupt message over a system bus 27 to the CPU, but other methods of interrupt signaling that are known in the art may alternatively be used.

Multiple virtual machines 28, labeled VM1, VM2, ..., VMn, may be active on CPU 21 at any given time. The virtual machines are supported by a VMM 30, as explained above, which is responsible for instruction virtualization and swapping of the VMs in and out of cores 22 as required. Each VM 28 has an assigned region 34 in a memory 32. Each such region is used to store context information (including the contents of registers 24) for the corresponding VM, and also includes a dedicated interrupt address 35, typically at a predefined offset within the region.

Address 35 is used to store the contents of CPU interrupt status register 25 that is associated with the VM in question when the VM is unable to receive the interrupt, either because it is swapped out of operation or has disabled interrupts on the core on which it is running. Several interrupts may be recorded ("set") in this interrupt status register and correspondingly in address 35, and all of them should be "sticky"—meaning that setting one interrupt will not clear others that were set previously. This "stickiness" may be achieved by appropriate hardware design in the CPU. Additionally or alternatively, region 34 may comprise one byte in memory 32 for each bit in the interrupt status register, and setting a given interrupt bit for a VM is accomplished by writing "1" to the corresponding byte. When the VM is swapped in and/or interrupts are enabled, each bit in the interrupt status register gets a bit from the corresponding byte in the memory.

System 20 is connected to a network 38 via a NIC 36, such as a host channel adapter (HCA). Typically, NIC 36 maintains one or more dedicated transport service instances, such as queue pairs (QPs), for each VM 28. Upon receiving a packet from network 38 on a given QP, the NIC writes the packet contents to an appropriate address in memory 32 and directs an interrupt to the corresponding VM, indicating to the VM that there is packet data waiting to be serviced. (NIC 36 may also raise interrupts for other reasons.)

When VMs are swapped, VMM 30 informs NIC 36, typically by sending messages over bus 27, which VMs are active (currently swapped in and running on one of cores 22) and which have been swapped out. NIC 36 may issue its interrupts differently depending on whether the VM to which the interrupt is directed is active or swapped out. In an alternative implementation, VMM 30 may notify interrupt-handling hardware in CPU 21 of the swap, and the CPU hardware makes the interrupt-handling decisions that are attributed to the NIC in the following description. Similar sorts of mechanisms may be used in handling interrupts for VMs that are active but interrupt-disabled, as well as for enhancing interrupt-handling functionality in other situations in which a given core running a VM may be temporarily unable to receive an interrupt pertaining to the VM.

The embodiments described above assume that the interrupt-handling hardware in CPU 21, including the interrupt controller and interrupt status register, are controlled by the host operating system (OS), in interaction with the VMM, as in computers that are known in the art. In an alternative embodiment, interrupt controller 26 and interrupt status register 25 may comprise special hardware components that are dedicated for direct access by the guest OS running on the VM 28 that is currently active on the core 22 in question. This alternative architecture allows the VM itself to enable and disable interrupts and to process interrupts when they arrive, thus reducing the burden on VMM 30. The VM-level interrupt controller and register can handle both interrupts from I/O devices, such as NIC 36, and internal system interrupts, such as page fault interrupts arising in the course of virtual/physical memory address translation.

When VMM 30 swaps out a given VM 28, it is important that interrupts generated by NIC 36 for this VM not be lost and that these interrupts be delivered to the VM when it is swapped back in. For this reason, the VMM notifies the NIC (or the appropriate CPU hardware) when it intends to swap a particular VM out. The interrupt-handling hardware in the NIC (or CPU) acknowledges this notification, and the VMM then performs the swap. Following the notification, subsequent interrupts generated for the swapped-out VM will be written to the assigned interrupt address 35 in memory 32. This protocol assures that all interrupts generated prior to the notification will be delivered to the VM before it is swapped out, and all interrupts occurring subsequently will be delivered to the VM after it is swapped back in.

It is also important to ensure that interrupts generated during the process of swapping in a given VM be delivered reliably to the VM when it starts running. For this purpose, the interrupt-handling hardware in CPU 21 may be designed in such a way that when a value is written to the interrupt status register of the core 22 on which a given VM has been activated, the CPU hardware takes a logical OR between this value and the value held in the assigned interrupt address 35 for this VM (assuming the value of the "interrupt active" bit in the register is configured as active-high). A distinct "clear interrupt register" instruction is implemented in order to clear the interrupt status register.

In preparation for swapping a certain VM 28 into a given core 22, VMM 30 clears the interrupt status register on the core and notifies the interrupt-handling hardware in the NIC (or the CPU) of its intention to swap the VM in. Following this notification, all subsequent interrupts generated for this VM will be directed to the interrupt status register in core 22 (rather than to the assigned address in memory 32). The interrupt-handling hardware acknowledges this notification. VMM 30 swaps VM 28 into the core, wherein the swap includes writing the contents of interrupt address 35 from the VM context in memory 32 to the interrupt status register in the core hardware. Since this write operation causes the CPU hardware to take a logic OR between the value being written to the register and any value that is already stored there, any interrupts received during the swap-in process will be delivered to the VM once it starts running.

Again, mechanisms similar to those described above may be used to identify cores 22 on which the respective, active VMs 28 have disabled interrupts and to provide interrupt information to those cores when interrupts are enabled.

Figure 2:
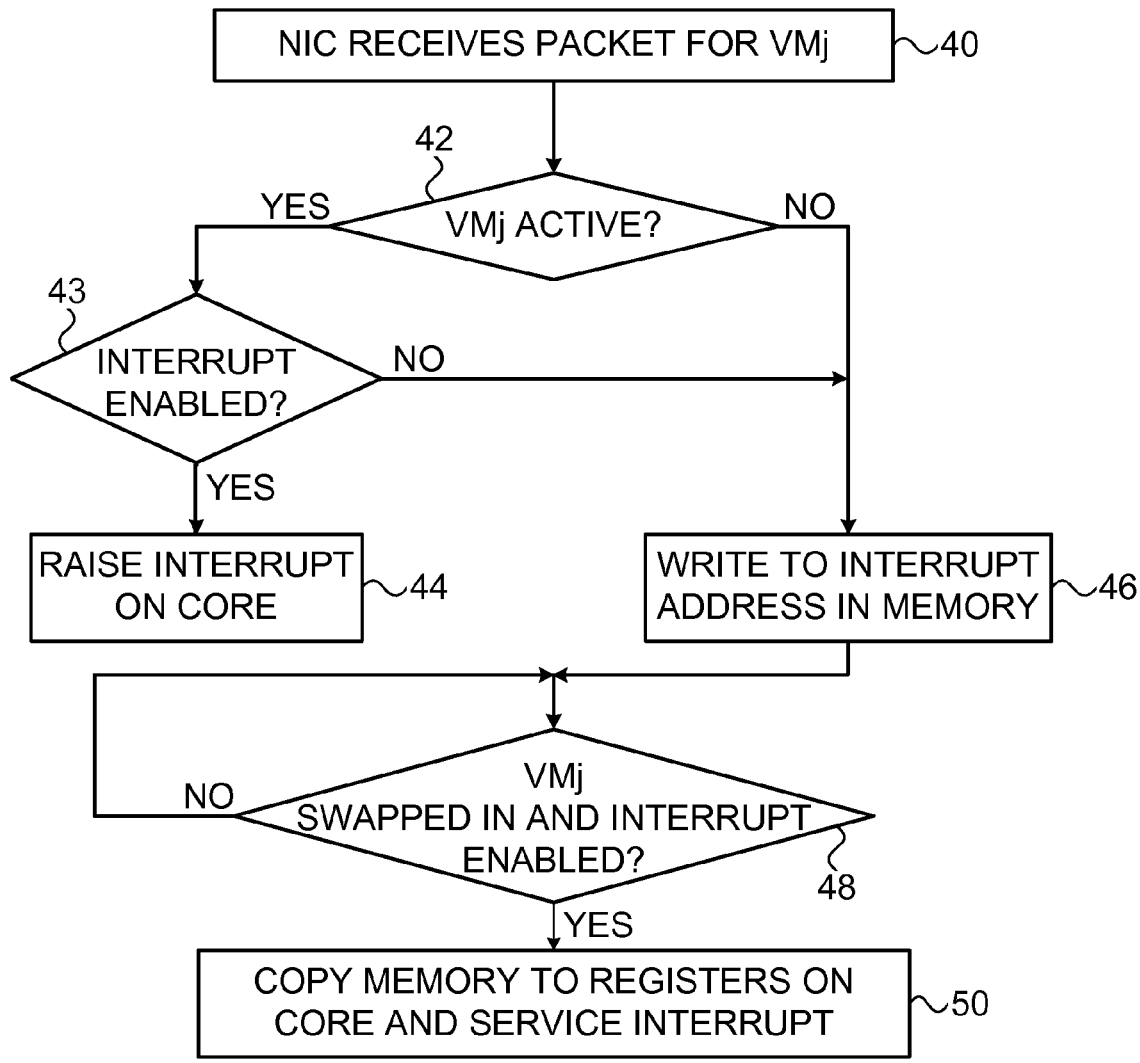
FIG. 2 is a flow chart that schematically illustrates a method for interrupt handling, in accordance with an embodiment of the present invention.

FIG. 2 is a flow chart that schematically illustrates a method for handling interrupts in system 20, in accordance with an embodiment of the present invention. The method in this embodiment is initiated when NIC 36 receives a packet from network 38 that is directed to a given VM 28, at a packet reception step 40. For example, the packet header may identify it as belonging to a certain QP, which is associated with a certain virtual machine VMj. NIC 36 writes the packet data to memory 32 and checks its internal records to determine whether VMj is active or swapped out, at a VM checking step 42. If VMj is active, NIC 36 may check whether interrupts are enabled on the CPU core on which VMj is running, at an enablement checking step 43. If so, NIC 36 raises a hardware interrupt in the usual fashion, at an active interrupt step 44. For example, NIC 36 may send an interrupt message over bus 27 to the core 22 on which VMj is running, thereby notifying interrupt controller 26 of the interrupt to be serviced.

On the other hand, if VMj is found to be swapped out at step 42 or interrupt-disabled at step 43, NIC 36 writes an interrupt message to interrupt address 35 in the region 34 of memory 32 that is assigned to VMj, at an interrupt writing step 46. Typically, this interrupt will not be serviced immediately by CPU 21, but rather will wait until VMj is swapped in and interrupt-enabled. VMM 30 may poll interrupt addresses 35 periodically and may decide to swap in a given VM 28 at a convenient time after discovering that this VM has an interrupt message waiting. Optionally, step 46 may be used only for low-priority types of interrupts; and for high-priority types, NIC 36 may send an interrupt directly to VMM 30 even when the target VM is swapped out in order to invoke immediate swap-in of this VM.

The interrupt written at step 46 is acted upon only after VMj is swapped into one of cores 22, and the core is enabled to receive interrupts, at an interrupt enablement step 48. At this stage, VMM 30 typically copies the context information in memory region 34 of VMj into registers 24 (including interrupt status register 25) of the appropriate core, at a context switching step 50. Cores 22 are configured so that copying the interrupt message from address 35 to core 22 automatically alerts interrupt controller 26. Alternatively, when interrupt status register 25 is dedicated to VM 28, and interrupt controller 26 is configured for interaction with the guest OS running on the VM, step 50 may be carried out, at least in some cases, by VMj itself.

In either case, after the interrupt status register contents have been copied from address 35 to interrupt status register 25, VMj will then service the interrupt in the normal manner, for example by reading the packet data that NIC 36 has written to memory 32 and passing the data for processing by the appropriate application running on VMj.

As explained and demonstrated above, although the embodiment that is shown in the figures involves a particular computer system architecture and components, the principles of the present invention may be applied in substantially any suitable architecture and set of components. For example, the functionality described above with respect to NIC 36 may similarly be implemented in other sorts of devices, including various I/O, peripheral and processing devices.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for computing, comprising:
   running a plurality of virtual machines on a computer having one or more cores and a memory and a peripheral device that is coupled to the one or more cores;
   upon occurrence of an event originating at the peripheral device and pertaining to a given virtual machine, identifying at the peripheral device whether the given virtual machine is active or swapped out;
   raising a hardware interrupt immediately upon identifying by the peripheral device that the given virtual machine is active;
   upon identifying by the peripheral device that the given virtual machine is swapped out, writing an interrupt message from the peripheral device to a pre-assigned interrupt address in the memory; and
   when the given virtual machine is able to receive the interrupt, after writing of the interrupt message, copying a context of the given virtual machine from the memory to a given core on which the given virtual machine is running, and automatically raising a hardware interrupt on the given core responsively to the interrupt message in the memory.

2. The method according to claim 1, wherein the interrupt message is written to the interrupt address while the given virtual machine is swapped out of operation, and wherein the context is copied responsively to activating the given virtual machine on the given core.

3. The method according to claim 1, wherein the interrupt message is written to the interrupt address while interrupts are disabled at least to the given core on which the given virtual machine is running, and wherein the context is copied responsively to enabling the interrupts on the given core.

4. The method according to claim 1, wherein the peripheral device comprises a network interface controller (NIC), and wherein the event comprises receiving at the NIC a data packet directed to the given virtual machine.

5. The method according to claim 1, wherein the event causing the interrupt message to be written to the pre-assigned interrupt address in the memory is a first event type, and wherein the method comprises, upon the occurrence of events of a second event type, raising the hardware interrupt for service by the given virtual machine immediately even when the given virtual machine is swapped out.

6. The method according to claim 1, wherein automatically raising the hardware interrupt comprises copying the interrupt message from the respective interrupt address to an interrupt status register on the given core.

7. The method according to claim 6, wherein the interrupt message is copied and the hardware interrupt is raised by a virtual machine monitor (VMM), which runs on the computer and supports the virtual machines.

8. The method according to claim 6, wherein the interrupt message is copied to a dedicated interrupt status register that is serviced by the given virtual machine.

9. Computing apparatus, comprising:
   one or more computing cores, configured to run a plurality of virtual machines;
   a memory, connected to the computing cores; and
   a peripheral device, which is connected to the cores and the memory and is configured, upon occurrence of an event originating at the peripheral device and pertaining to a given virtual machine during a period in which the given virtual machine is unable to receive the interrupt, to write an interrupt message to a pre-assigned interrupt address in the memory,
   wherein the peripheral device is configured to identify whether the given virtual machine is active or swapped out, and to decide to write the interrupt message to the memory when the given virtual machine is swapped out or to raise a hardware interrupt immediately when the given virtual machine is active, and
   wherein the cores are configured, when the given virtual machine is able to receive the interrupt, after writing of the interrupt message, to copy a context of the given virtual machine from the memory to a given core on which the given virtual machine is running, and to automatically raise the hardware interrupt on the given core responsively to the interrupt message in the memory.

10. The apparatus according to claim 9, wherein the interrupt message is written to the interrupt address while the given virtual machine is swapped out of operation, and wherein the context is copied responsively to activating the given virtual machine on the given core.

11. The apparatus according to claim 9, wherein the interrupt message is written to the interrupt address while interrupts are disabled at least to the given core on which the given virtual machine is running, and wherein the context is copied responsively to enabling the interrupts on the given core.

12. The apparatus according to claim 9, wherein the peripheral device comprises a network interface controller (NIC), and wherein the event comprises receiving at the NIC a data packet directed to the given virtual machine.

13. The apparatus according to claim 9, wherein the event causing the device to write the interrupt message is a first event type, and wherein the device is configured, upon the occurrence of events of a second event type, to raise the hardware interrupt for service by the given virtual machine immediately even when the given virtual machine is swapped out.

14. The apparatus according to claim 9, wherein the cores comprise respective interrupt status registers and are configured, upon activating the given virtual machine, to copy the interrupt message from the respective interrupt address to an interrupt status register on the given core.

15. The apparatus according to claim 9, wherein the interrupt message is copied and the hardware interrupt is raised by a virtual machine monitor (VMM), which runs on the computer and supports the virtual machines.

16. The apparatus according to claim 9, wherein the cores comprises a dedicated interrupt status register that is serviced by the given virtual machine and are configured to copy the interrupt message to the dedicated interrupt status register.

\* \* \* \* \*